(12) United States Patent
Spaulding et al.

(10) Patent No.: US 7,535,596 B2
(45) Date of Patent: May 19, 2009

(54) COLORANT CONTROL VALUES FOR COLOR PRINTING DEVICES

(75) Inventors: Kevin E. Spaulding, Spencerport, NY (US); Gustav J. Braun, Fairport, NY (US); John R. D'Errico, Alton, NY (US)

(73) Assignee: Eastman Kodak Company, Rochester, NY (US)

( * ) Notice: Subject to any disclaimer, the term of this patent is extended or adjusted under 35 U.S.C. 154(b) by 786 days.

(21) Appl. No.: 11/121,768

(22) Filed: May 4, 2005

(65) Prior Publication Data

US 2006/0250624 A1    Nov. 9, 2006

(51) Int. Cl.
*G03F 3/08* (2006.01)
*G06K 15/00* (2006.01)

(52) U.S. Cl. ........................................ 358/1.9; 358/518

(58) Field of Classification Search ................. 357/3.23, 357/3.01, 1.9, 1.1, 1.8; 358/1.1, 1.13, 500, 358/511, 515, 518, 519, 525, 448, 461; 382/162, 382/167, 254, 276

See application file for complete search history.

(56) References Cited

U.S. PATENT DOCUMENTS

| | | | |
|---|---|---|---|
| 4,482,917 A | 11/1984 | Gaulke et al. | |
| 5,305,119 A * | 4/1994 | Rolleston et al. | 358/522 |
| 5,402,253 A | 3/1995 | Seki | |
| 5,528,386 A | 6/1996 | Rolleston et al. | |
| 5,553,199 A | 9/1996 | Spaulding et al. | |
| 5,721,572 A * | 2/1998 | Wan et al. | 345/590 |
| 5,857,063 A | 1/1999 | Poe et al. | |
| 5,870,530 A | 2/1999 | Balasubramanian | |
| 5,892,891 A | 4/1999 | Dalal et al. | |
| 5,982,990 A * | 11/1999 | Gondek | 358/1.9 |
| 2002/0181964 A1* | 12/2002 | Campbell et al. | 399/49 |
| 2004/0109180 A1* | 6/2004 | Braun et al. | 358/1.9 |
| 2004/0202365 A1* | 10/2004 | Spaulding et al. | 382/162 |

OTHER PUBLICATIONS

"Colorimetric calibration in electronic imaging devices using a look-up table model and interpolations" by P. Hung (Journal of Electronic Imaging, vol. 2(1), pp. 53-61, 1993).

* cited by examiner

*Primary Examiner*—Gabriel I Garcia
(74) *Attorney, Agent, or Firm*—Raymond L. Owens

(57) ABSTRACT

A method for determining colorant control values for a color imaging device having four or more colorants is disclosed. The method includes defining a color mapping for a set of paths through a three-channel color space, defining a color mapping function for the three-channel color space relating the three-channel color space values to colorant control values for the four or more colorants of the color imaging device by interpolating between the color mapping defined for the set of paths, forming a forward three-channel color model relating the three-channel color space values to device-independent color values, inverting the forward three-channel color model to determine an inverse three-channel color model relating the device-independent color values to the three-channel color space values, and combining the inverse three-channel color model and the color mapping function to determine an inverse device color model.

23 Claims, 9 Drawing Sheets

COLORANT CONTROL VALUES FOR COLOR PRINTING DEVICES

FIELD OF THE INVENTION

This invention pertains to the field of digital color printing, and more particularly to a method for building an inverse device color model for a color printing device having four or more colorants.

BACKGROUND OF THE INVENTION

The normal human visual system is trichromatic in nature, meaning that visual color can be described mathematically as a three-dimensional space. A number of different three-dimensional color spaces have been used to represent visual color. Most notable are the well known color spaces defined by the Commission Internationale de l'Eclairage (CIE), such as CIE XYZ, CIELAB (L*a*b*), and CIELUV (L*u*v*). In these color spaces, a point represents a color that is visually distinct from those represented by other points in that space. They are often referred to as device-independent color spaces since they can be used to represent visual color independent of what device may have been used to produce the color. Device-independent color values are generally determined by measuring the spectral content of an image sample using a spectrophotometer, and then performing a series of required calculations associated with the definition of the color space. Alternatively, device-independent color values can be measured directly with a measuring device such as a colorimeter.

Color imaging devices are used to display or print digital image content for many applications ranging from softcopy computer displays, to desktop printers for personal computers, to high-volume graphic arts printing presses. A corollary of the trichromatic nature of color vision is that the satisfactory reproduction of colors requires the use of 3 independent colorants. Most softcopy display devices make use of three additive color primaries, typically red, green, and blue (abbreviated as RGB). Most hardcopy color printing devices make use of at least three chromatic colorants, typically cyan, magenta, and yellow (abbreviated as CMY). In addition, color printing devices can use an achromatic, or black colorant (abbreviated as K). In some cases, light colorants, such as light cyan and light magenta, or additional chromatic colorants, such as red, blue, green, or orange can also be used.

For color imaging devices that use three colorants, there will generally be a unique one-to-one relationship between the device colorant control values (e.g., RGB code values), and the resulting device-independent color values (e.g., L*a*b*) produced by the device. In many applications, it will be desirable to determine what device colorant control values would be needed to produce a desired set of device-independent color values.

FIG. 1 illustrates a prior art method for producing a desired color on a three-channel RGB color imaging device. First, a forward device model 12 is formed relating the RGB device code values 10 to the resulting device-independent color values 14 in a color space such as L*a*b*. Such forward device models 12 can sometimes be determined by modeling the physics of the color imaging device, for example accounting for the phosphor colors and nonlinear response of a softcopy display system. In other cases, forward device models 12 can be determined empirically by printing patches with known RGB device code values 10, and measuring the resulting device-independent color values 14. A mathematical model can then be determined from the measured data. The mathematical model can be a parametric model, or can include a three-dimensional look-up table (LUT) storing the resulting device-independent color values 14 for a lattice of RGB device code values 10.

A build three-channel inverse device model step 16 can then be used to determine an inverse device model 18 from the forward device model 12. The inverse device model 18 can be used to determine the RGB device code values 10 necessary to produce a desired set of device-independent color values 14. Since there is generally a one-to-one relationship between the RGB device code values 10 and the device-independent color values 14, there will be a unique inverse transform for all colors within the color gamut of the color imaging device. (The term color gamut refers to the range of colors that can be produced on a given color imaging device.) In some cases, it can be possible to mathematically invert the forward device model depending on its functional form. In other cases, interpolation methods or iterative techniques can be used to determine the inverse device model. For example, see "Colorimetric calibration in electronic imaging devices using a look-up table model and interpolations" by P. Hung (Journal of Electronic Imaging, Vol. 2(1), pp. 53-61, 1993).

Inverse device models 28 are commonly used by color management systems, where they are often referred to as "output device profiles." Often an output device profile for a particular output device is combined with a forward device model for a particular input device (commonly referred to as an "input device profile") to form a color transform that can be used to transform the input device code values to the corresponding device code values that will produce the same device-independent color values on the output device.

FIG. 2 illustrates an analogous method for producing a desired color on a 4-channel CMYK color printing device. First, a forward device model 22 is formed relating the CMYK device code values 20 to the resulting device-independent color values 24 in a color space such as L*a*b*. A build four-channel inverse device model step 26 can then be used to determine an inverse device model 28 from the forward device model 22. The inverse device model 28 can be used to determine the CMYK device code values 20 necessary to produce a desired set of device-independent color values 24.

Although the methods shown in FIG. 1 and FIG. 2 appear to be quite similar, the problem of determining an inverse device model is actually significantly more complicated for color imaging devices using four or more colorants, such as one that uses CMYK colorants. Since the colorant control value space in a CMYK system has a higher dimension (4) than device-independent color spaces (3), there is generally no unique way to reproduce a given visual color. Typically, there will an infinite number of CMYK combinations that can be used to produce a given device-independent color. The resulting ambiguity has to be resolved by imposing additional constraints in order to determine the CMYK values that should be used to produce a desired device-independent color.

Historically, simple mathematical equations have been used to convert scanner RGB values to CMYK values for offset printing presses for use in the graphic arts industry. For example, a simple complement function can be used to determine CMY color values from input RGB color values $C = 1 - R$ $M = 1 - G$ $Y = 1 - B$.

Subsequently, a K color value is produced in order to add black to the CMY overprints. In the simplest case, the K color value can be determined as a function of the minimum of the CMY color values. (For example, see U.S. Pat. No. 4,482, 917.) When black is added to an overprint, the CMY color values should generally be reduced accordingly, in order to keep the color from darkening.

Various strategies have been developed in the printing industry for using more or less black in printing various colors, and for adjusting the amounts of the chromatic colorants. These techniques have been known as Under Color Removal (UCR), Grey Component Replacement (GCR), and Under Color Addition (UCA). Unfortunately, these terms have been used differently by different writers and have lost the precise meaning they once may have had. Most of these earlier methods cannot automatically preserve color fidelity to a high degree of accuracy, because the conversion of RGB to CMY and the conversion of CMY to CMYK are not based on accurate calorimetric models of the color reproduction process.

The need for determining calorimetrically accurate inverse device models for CMYK color printing devices have been addressed in U.S. Pat. No. 5,402,253 to Seki. This patent discloses a method where K is treated as an extra dimension that should be assigned a specific value by imposing an additional constraint or relation that becomes a condition imposed on an iterative search for an inverse.

In U.S. Pat. No. 5,305,119 and U.S. Pat. No. 5,528,386, Rolleston et al. similarly impose a relation between K and CMY. However, their method establishes the form of this relation prior to the colorimetric characterization. The model is defined over a three-dimensional space, and the 4-dimensional ambiguity is avoided from the beginning. Color patches are printed and measured with the imposed relation, resulting in a three dimensional model that can be inverted.

In U.S. Pat. No. 5,553,199, Spaulding et al. disclose a method for producing inverse device models that involves producing data structures that can be used to determine minimum and maximum black levels using conventional three-dimensional inverse interpolation. A K value can then be determined using a functional relationship, and another conventional three-dimensional inverse interpolation can then be used to find the CMY values.

In U.S. Pat. No. 5,857,063, Poe et al. disclose a method for controlling the color of a multi-colorant printing system that includes defining a transform from a three-dimensional parameter space to the colorant control space. The basic method that they employed is summarized in the flowchart given in FIG. 3. A color mapping function 31, referred to as S(c,m,y) in Poe et al., is defined which specifies a mapping from a three-channel parameter space with cmy parameter space code values 30 to CMYK device code values 32. The color mapping function 31 controls the usage of K relative to the usage of CMY, and is specified by a series of functional relationships with various control parameters. The color mapping function 31 can be combined with a forward device model 33 (referred to as R(C,M,Y,K) in Poe et al.) to form a composite transform 35 (referred to as T(c,m,y) in Poe et al.). The composite transform 35 can be used to transform from the cmy parameter space code values 30 to corresponding device-independent color values 34. Since the composite transform 35 has three input dimensions and three output dimensions, it can be readily inverted using a build inverse composite transform step 36 to form an inverse composite transform 37, which can be used to transform from device-independent color values 34 back to corresponding cmy parameter space code values 30.

FIG. 4 illustrates how this inverse composite transform 37 can be combined with the color mapping function 31 to form an inverse device model 38. (The same part numbers are used here as were used in FIG. 3 to refer to the identical elements.) The inverse device model 38 can be used to determine the CMYK device code values 32 that will produce a desired set of device-independent color values 34. The inverse device model 38 is the key result which is required to form a color management output profile, or a color transform from a known input device to the color printing device.

As mentioned above, the color mapping function 31 plays the important role of controlling the usage of K relative to the usage of CMY throughout the color gamut of the printer. The functional relationships disclosed by Poe et al. provide many degrees of freedom to control this relationship. However, they do not provide any mechanism for flexibly and independently controlling this relationship for different parts of color space in order to enable making tradeoffs between color gamut, noise, and ink usage differently as a function of color. Additionally, there is no way for conveniently extending this method for use with additional colorants beyond CMYK.

Several approaches have been disclosed for determining colorant control values for printing systems with extra gamut colorants, such as green, orange, red or blue. In U.S. Pat. No. 5,870,530, Balasubramanian discloses a method where a secondary colorant is nonlinearly substituted for combinations of primary colorants using an approach similar to UCR. In U.S. Pat. No. 5,892,891, Dalal et al., disclose a method where a conventional CMYK gamut is supplemented by mutually exclusive extended gamut regions that uses an extended gamut colorant and excludes a complementary one of the CMY colorants.

SUMMARY OF THE INVENTION

It is an object of the present invention to provide an effective way for determining colorant control values for a color printing device having four or more colorants.

This object is achieved by a method for determining colorant control values for a color imaging device having four or more colorants, comprising:

a) defining a color mapping for a set of paths through a three-channel color space relating the three-channel color space values along that path to corresponding colorant control values for the four or more colorants of the color imaging device;

b) defining a color mapping function for the three-channel color space relating the three-channel color space values to colorant control values for the four or more colorants of the color imaging device by interpolating between the color mapping defined for the set of paths;

c) forming a forward three-channel color model relating the three-channel color space values to device-independent color values by using the color mapping function to relate the three-channel color space values to colorant control values for the four or more colorants of the color imaging device, and then further relating the colorant control values for the four or more colorants of the color imaging device to corresponding device-independent color values;

d) inverting the forward three-channel color model to determine an inverse three-channel color model relating the device-independent color values to the three-channel color space values; and e) combining the inverse three-channel color model and the color mapping function to determine an inverse device color model relating device-independent color values to colorant control values for the four or more colorants of the color imaging device.

Advantages

This invention has the advantage that it provides convenient control over the usage of the different colorants in a color imaging device having four or more colorants as a function of location in color space. It has the additional advantage that it provides a mechanism for trading off the importance of factors such as color gamut, image noise, and total colorant amount as a function of location in color space. It has a further advantage that it provides a method that is readily extensible for use with other colorants besides cyan, magenta, yellow, and black.

DETAILED DESCRIPTION OF THE INVENTION

Figure 1:
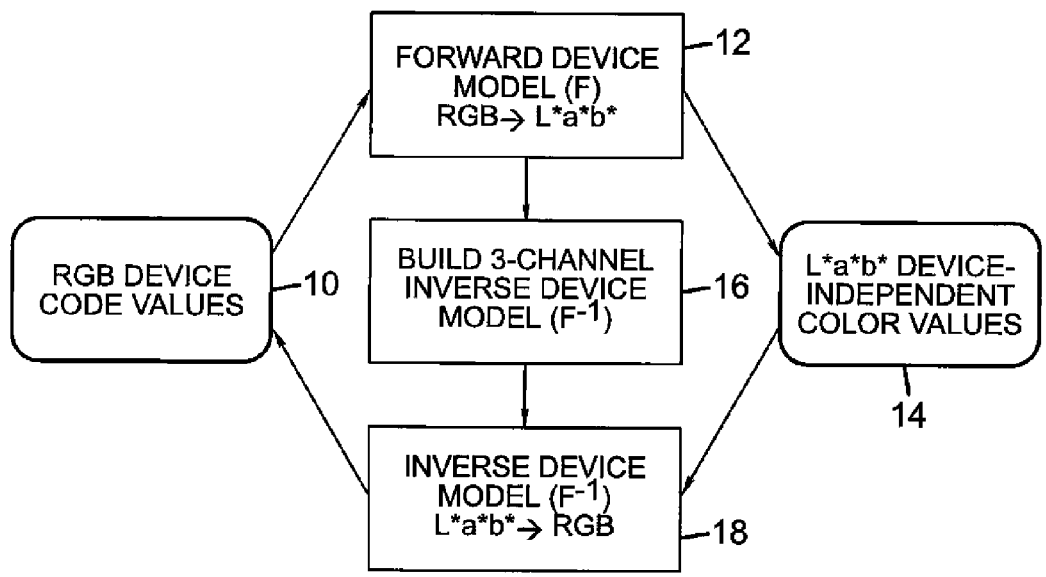
FIG. 1 is a flowchart showing a prior art method for building color transforms for RGB devices.
Figure 2:
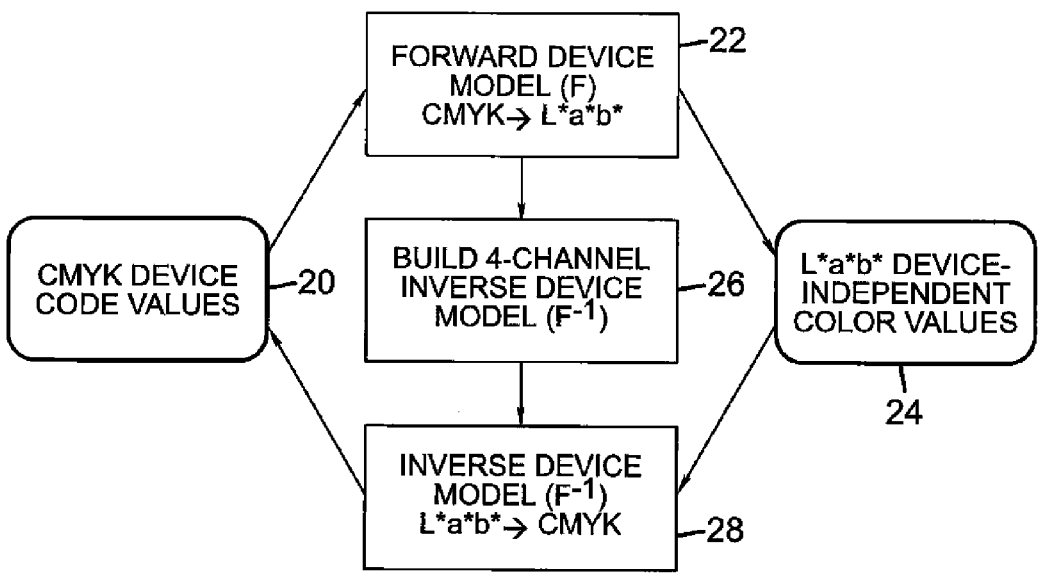
FIG. 2 is a flowchart showing a prior art method for building color transforms for CMYK devices.
Figure 3:
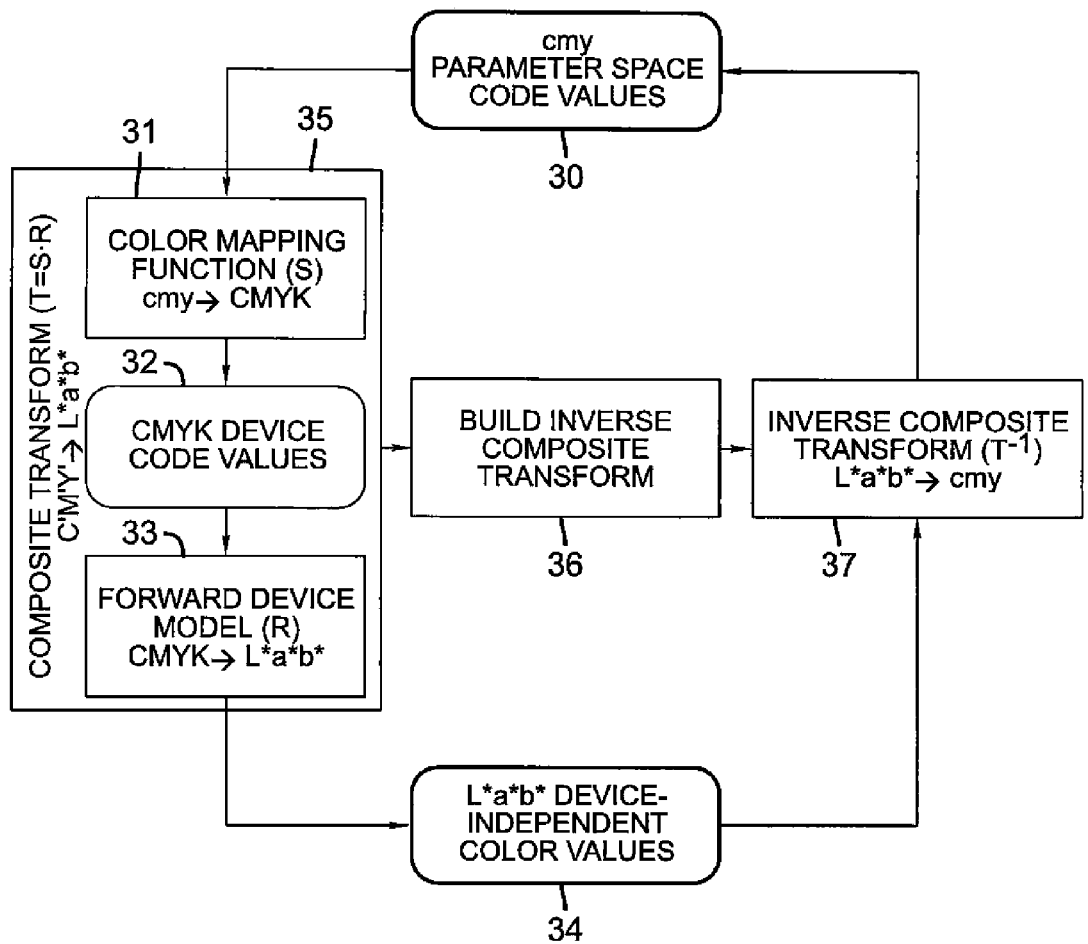
FIG. 3 is another flowchart showing a prior art method for building color transforms for CMYK devices.

The method disclosed by Poe et al. in U.S. Pat. No. 5,857,063 and described earlier in the background of this invention has a number of very desirable features, but it has the limitation that the using a mathematical function to define the color mapping function that relates the three-dimensional parameter space to the CMYK device code value space provides little flexibility for controlling the usage of the colorants as a function of location in color space. Although the functional relationships disclosed by Poe et al. provide many degrees of freedom to control the relationship between the usage of the various colorants, they do not provide any mechanism for independently controlling this relationship for different parts of color space to provide optimal tradeoffs between maximizing color gamut, reducing image noise, and avoiding artifacts associated with applying too much colorant. Nor is their method readily extensible for using additional colorants beyond CMYK. These limitations become particularly important for printing technologies, such as ink jet printers, which have characteristics that are significantly different than conventional offset printing presses for which the method of Poe et al. was originally intended. In order to add additional flexibility to the functional equations used to define this color mapping function would significantly increase their complexity to the point that they would become impractical. The present invention addresses these limitations by extending the method of Poe et al. to use a flexible color mapping function definition that permits the color mapping function to be conveniently and independently specified for a set of paths through color space.

The present invention will now be described with reference to FIG. 5. The invention is directed to forming an inverse device color model 61 for a color imaging device having four or more colorants. The inverse device color model 61 relates device-independent color values to corresponding colorant control values for the four or more colorants. It will be recognized by one skilled in the art that such inverse device color models are useful and necessary components of color management transforms, which are commonly used to process color images in order to obtain the desired color on a color imaging device. There are many different types of color imaging devices, which can generally be categorized as either hard-copy color printing devices or soft-copy color display devices. Although the method of the present invention can be applied to any type of color imaging device having four or more colorants, the examples described in the following detailed description will focus on hard-copy color printing devices. However, it will be obvious to one skilled in the art that it can be applied to other color imaging technologies as well.

First, a set of paths 50 through a three-channel color space are defined. A define color mappings for paths step 51 is then used to determine color mappings 52 for the set of paths. A define full color mapping function step 53 is used to determine a full color mapping function 54 by interpolating between the color mappings 52 for the set of paths. The full color mapping function 54 relates the three-channel color space values to colorant control values for the four or more colorants.

A form forward three-channel color model step 55 is used to determine a forward three-channel color model 57 relating the three-channel color space values to device-independent color values. The forward three-channel color model step 55 works by combining the full color mapping function 54 with a color printing device characterization 56 that relates the colorant control values for the four or more colorants to corresponding device-independent color values.

Next, a determine inverse three-channel color model step 58 is used to determine an inverse three-channel color model 59 by performing a mathematical inversion of the forward three-channel color model 57. The resulting inverse three-channel color model step 59 relates device-independent color values to corresponding three-channel color space values. Finally, a determine inverse device color model step 60 is used to determine an inverse device color model 61 relating device-independent color values to corresponding colorant control values for the four or more colorants. The determine inverse device color model step 60 works by combining the inverse three-channel color model step 59 with the full color mapping function 54.

The steps of the present invention will now be discussed in more detail. One of the inputs to this method for forming an inverse device color model 61 is a set of paths 50 through a three-channel color space. The three-channel color space is a parameter space analogous to that used by Poe et al. The three channels of the color space will be referred to as c, m, and y, and can be interpreted to be the control signals for a hypothetical subtractive three-channel color imaging system with cyan, magenta, and yellow primaries. For purposes of illustration, it can be assumed that each of the three channels has associated with it a color space value that ranges from zero to one. However, it will be recognized by one skilled in the art that other ranges of color space values can also be used such as 0 to 100 or 0 to 255.

Figure 6:
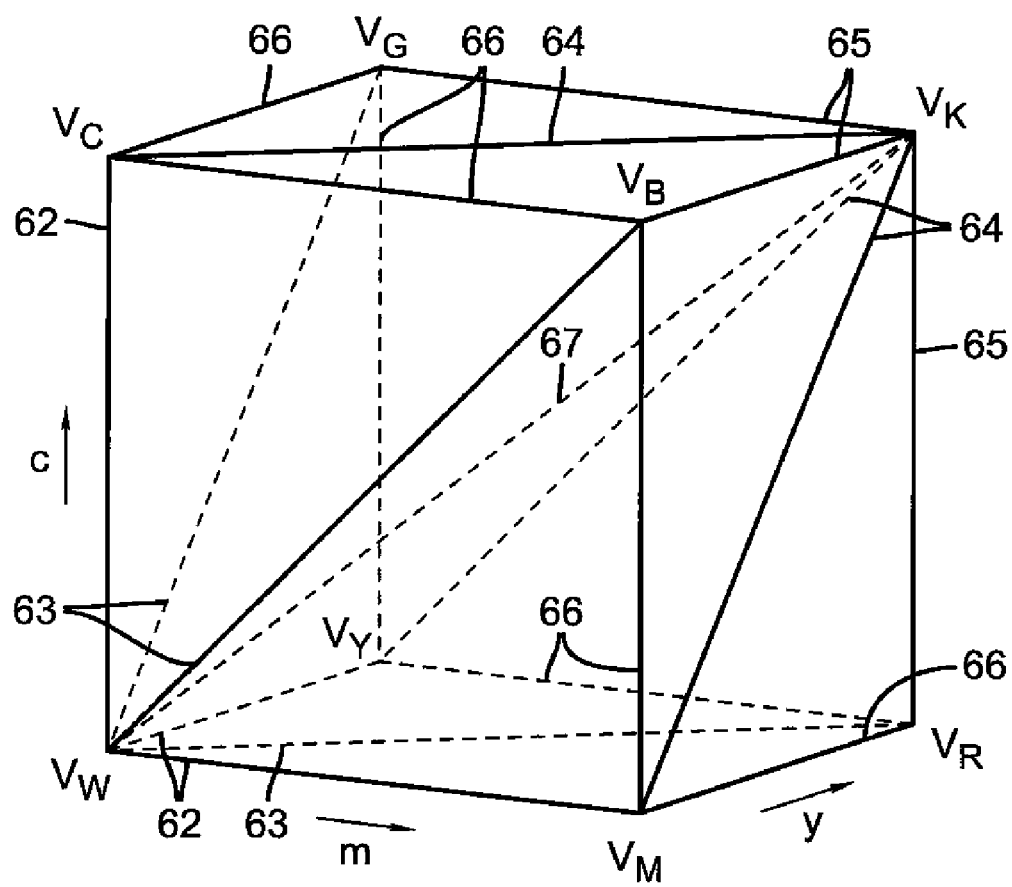
FIG. 6 is a diagram showing a set of paths through a three-channel color space.

The set of color values that can be represented within the three-channel color space can be visualized as a color space cube as shown in FIG. 6. The vertex of the color cube where c, m, and y are all zero would correspond to a white color, and is labeled as $V_W$. The vertex where c=1, m=0 and y=0 would correspond to the cyan primary, and is labeled as $V_C$. Likewise the vertex labeled as $V_M$ would correspond to the magenta primary, and vertex labeled as $V_Y$ would correspond to the yellow primary. The vertex where c=1, m=1 and y=0 would correspond to a blue secondary color, and is labeled as $V_B$. Similarly, the $V_R$ and $V_G$ vertices correspond to red and green secondary colors, respectively. The vertex where c=1, m=1, and y=1 would correspond to black, and is labeled as $V_K$.

In one preferred embodiment of the present invention, the set of paths 50 includes a set of white-to-primary paths 62 (white-to-cyan, white-to-magenta and white-to-yellow), a set of white-to-secondary paths 63 (white-to-red, white-to-green and white-to-blue), a set of black-to-primary paths 64 (black-to-cyan, black-to-magenta and black-to-yellow), a set of black-to-secondary paths 65 (black-to-red, black-to-green and black-to-blue), a set of primary-to-secondary paths 66, and a neutral axis path 67 connecting the black and white points. However, it will be recognized by one skilled in the art that many other sets of paths can also be used in accordance with the present invention. For example, additional paths can be added connecting the white and black points to points between the primary and secondary colors, or to points in the interior of the color cube. Similarly, not all of the paths listed above need to be included.

Once the set of paths 50 has been identified, the define color mappings for paths step 51 is used to define color mappings 52 for the set of paths. In a preferred embodiment of the present invention, the color mappings 52 are determined using an optimization process to optimize a cost function including one or more cost terms.

One example of a useful cost term is a cost term for maximizing color gamut. Such a cost term would cause the optimization process to prefer a color mapping that would produce a larger color gamut. In a preferred embodiment of the present invention, a gamut volume cost term is determined as a function of chroma values along the path. One such cost term is given by the integral $$Cost_{gamut} = \int_{cmy\,path} Chroma(Map(cmy))\,d(cmy)$$

where Map( ) is the color mapping function that returns the colorant control values as a function of the cmy three-channel color space values, and Chroma( ) is a function which returns the CIELAB chroma value as a function of the colorant control values.

Another cost term that is useful in some cases is a cost term for reducing image noise (i.e., granularity). Such a cost term would cause the optimization process to prefer a color mapping that would produce a lower noise level. Different CMYK colorant control values will produce images having different levels of noise. For example, two sets of CMYK colorant control values that produce the same visual color can have very different noise characteristics as a result of the different amounts of each colorant. Typically, CMYK combinations using more K and less CMY will have a substantially higher noise level. The noise as a function of the CMYK colorant control values can be modeled from measurements of test patches, or can be determined from knowledge of the device physics, the image structure and the colorants. One such cost term is given by the integral $$Cost_{noise} = \frac{1}{\int_{cmy\,path} G(Map(cmy))\,d(cmy)}$$

where G( ) is function that returns the granularity as a function of the colorant control values. In some cases, the noise can be assumed to be a function of only the black colorant level since it will often dominate the contributions of other colorants. In the simplest case, noise can be assumed to be proportional to the black colorant level.

Yet another cost term that can be useful in some cases is a term for reducing illuminant sensitivity. Illuminant sensitivity is a phenomenon where a color patch can look different under different illuminants (e.g., daylight, tungsten, and fluorescent). Illuminant sensitivity is a particularly objectionable phenomenon for neutral colors since the human visual system is particularly sensitive to color differences for near neutral colors. Generally, patch spectra that have fewer bumps and sharp transitions will be more insensitive to illuminant variations. There are a number of well known illuminant sensitivity indices that can be used to estimate how sensitive a certain color patch spectra will be to variations in illuminant spectra. Such illuminant sensitivity indices generally work by determining a color difference for an illuminant relative to some reference illuminant. Some common metamerism and color inconstancy indices that can be used to estimate illuminant sensitivity in accordance with the present invention are described in *Principles of Color Technology* by Roy S. Berns (Third Edition, John Wiley & Sons, Inc., New York, 2000, pp. 126-130).

It will be obvious to one skilled in the art that there are many other types of cost terms that can be useful in different applications. For example, it can be desirable to reduce the total colorant amount. This can have the advantage of reducing ink cost, reducing dry times, and reducing artifacts such as ink bleed and coalescence. Each of the different cost terms that are included in the cost function can be weighted to reflect their relative importance for a particular application. For example, in some applications, obtaining the largest color gamut can be the most important criteria for selecting a color path. In other applications, it can be more important to reduce noise.

In addition to defining a cost function for use in the optimization process, it can be desirable to impose a number of constraints on the optimization process. For example, it can be desirable to define a total colorant amount constraint. This constraint would require that the sum of the colorant amounts for each of the colorants be less than a predefined limit. For example, it can be known that a particular media can only absorb a certain amount of ink before it starts to coalesce on the surface. A constraint can be incorporated into the optimization process to ensure that the color mapping stays below this limit.

Other types of constraints can also be applied. For example, it can be desirable to constrain the yellow primary in the three-channel color space to map to full coverage of the yellow colorant. It can also be desirable to constrain the color mapping such that use of the black colorant is excluded in certain regions of color space. For example, it is generally not desirable to use the black colorant near the yellow vertex of the color space cube since this will generally produce objectionable noise. Similarly, it can be desirable to avoid using the black colorant in color space regions corresponding to skin tones. In some cases, the color mapping for one or more colorants can be constrained at every point along the path if it is known that a certain shape has desirable characteristics. Another type of constraint might specify a relationship between two or more colorant control values. For example, on a yellow-to-black path it can be desirable to constrain the amount of the magenta colorant to be equal to the amount of the cyan colorant. It will be obvious to one skilled in the art that many other types of constraints can be imposed to produce results that are desirable for a particular application.

Once the cost function and the constraints have been specified, an optimization process is used to determine the color mapping that optimizes the cost function subject to the defined constraints. Since the cost function will generally be nonlinear in nature, nonlinear optimization processes are typically required. Many such nonlinear optimization processes are known in the art that can be used in accordance with the present invention. One common nonlinear optimization process is the well known Monte Carlo optimization process, which involves randomly selecting values for a series of parameters and evaluating the cost function to determine which set of parameter values corresponds to the most optimal cost function value. This technique can be applied to the present invention by randomly selecting knot values for splines defining the color mapping for a path. Many common types of nonlinear optimization processes involve iteratively adjusting a set of parameter values and evaluating the cost function to determine which adjustments optimize the value of the cost function. The iteration process is repeated until the optimal parameter values are identified. An example of such a nonlinear optimization technique is the well known Levenberg-Marquardt algorithm. It will be obvious to one skilled in the art that there are many other optimization processes that can be used in accordance with the present invention are. Just a couple of examples are the well known "simulated annealing" and "genetic algorithm" optimization processes.

The color mappings 52 for the set of paths can be determined by determining an optimized color mapping for each point along each path through the three-channel color space. The cost function can be repeatedly evaluated for a large number of points and the results stored in a look-up table. In many cases, it can be preferable to determine optimized color mappings for a small number of points along a given path (e.g., the two endpoints and one or more interior points). Color mappings for the rest of the points can be determined by interpolating between the color mappings for the small number of points. Simple linear interpolation can be used, or more preferably, a spline interpolation method can be used to define a spline function. The color mappings for the small number of points serve as "knot points" for the spline. There are many well known techniques for defining a spline function from a set of knot points, such as the familiar cubic spline technique. The use of spline functions to define the color mappings 52 has the advantage of reducing the computation time associated with the optimization process, and also ensures that the resulting color mapping is smooth.

Figure 7A:
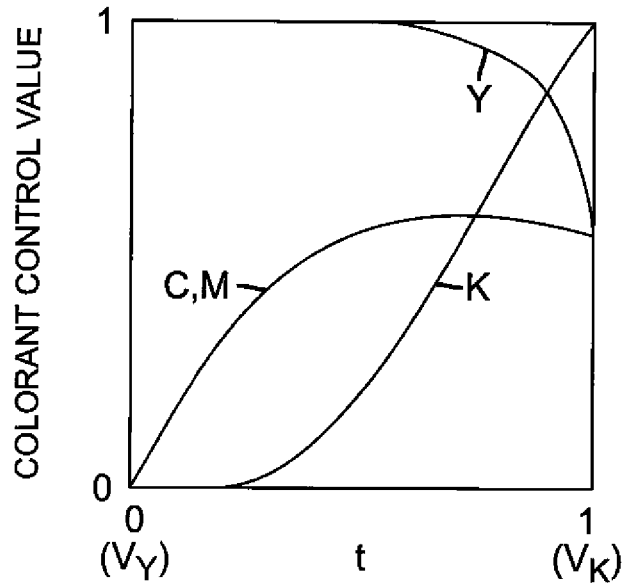
FIG. 7A is a diagram showing an example color mapping function for a black-to-primary path.

An example of a color mapping function for a black-to-primary path connecting the yellow vertex ($V_Y$) and the black vertex ($V_K$) is shown in FIG. 7A. The parameter t represents the fractional distance along the edge of the color space cube. In this example, the color mapping at the yellow vertex was constrained to be C=M=K=0.0, Y=1.0 (where a colorant control signal of 1.0 corresponds to full coverage of the colorant). Likewise, the color mapping at the black vertex was constrained to be C=M=Y=0.5, K=1.0. The curve labeled Y shows the yellow colorant control value along the path. It can be seen that the yellow colorant control signal stays at its maximum value for approximately the first half of the path, and then rolls off to its final value at the black vertex. The curve labeled K shows the black colorant control value along the path. It can be seen that the black colorant control signal stays at its minimum value for approximately the first quarter of the path, and then starts to grow until it reaches the full coverage level at the black vertex. The cost function used to produce this example discouraged the use of black near the yellow corner due to the high noise visibility that would be associated with putting sparse black dots on a yellow background. The curves labeled C and M are coincident, and show the cyan and magenta colorant control values, respectively, along the path. It can be seen that the amounts of the cyan and magenta colorants starts to grow immediately as the path progresses from yellow to black, but then rolls off to their final values.

Figure 7B:
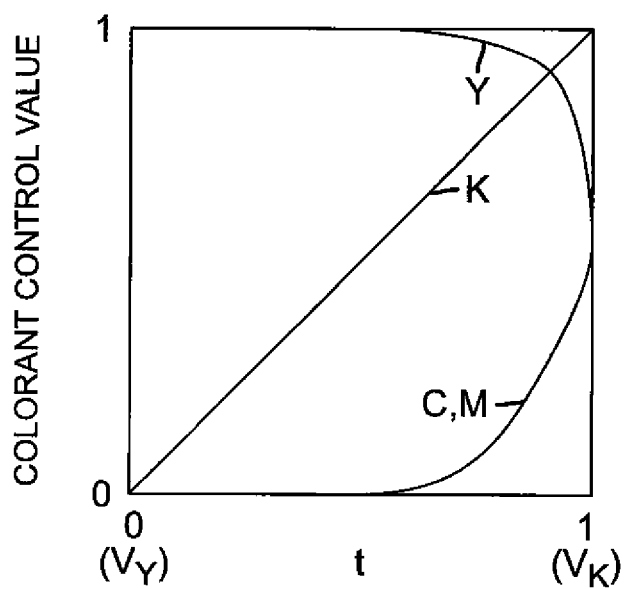
FIG. 7B is a diagram showing another example color mapping function for a black-to-primary path.

Another example yellow-to-black color mapping function is shown in FIG. 7B. A different cost function was used that placed more emphasis on maximizing color gamut rather than reducing image noise. As a result, the black colorant control vale K starts to grow immediately rather than being delayed until father down the path, and the cyan and magenta colorant control values (C and M) do not start to grow until midway down the path. The yellow colorant control value Y behaves much the same as it did in FIG. 7A.

The color mappings for some of the paths can be defined using a priori knowledge rather than using a cost function. For example, it is logical that the color mapping for the white-to-yellow path would generally involve adding only the yellow colorant, while keeping the cyan, magenta and black colorants at zero. Therefore, there is no need to use an optimization process to determine this mapping, and a simple linear interpolation process can be used to define the color mapping along this path.

Figure 8:
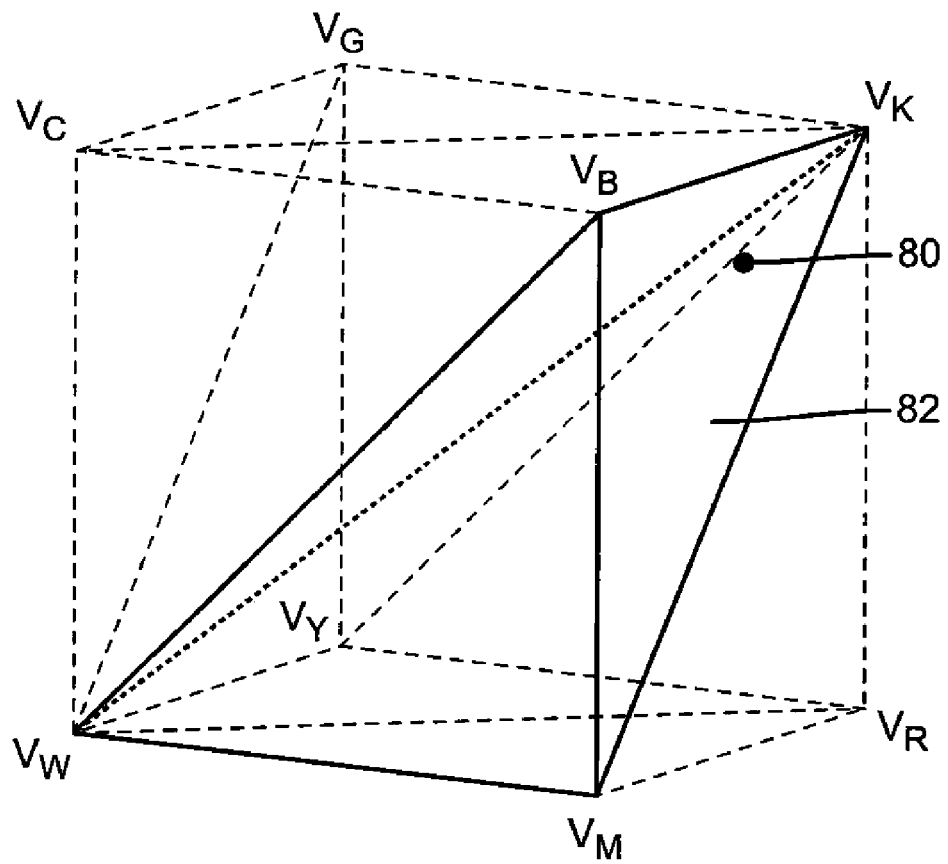
FIG. 8 is a diagram showing a three-channel color space tetrahedron.
Figure 9:
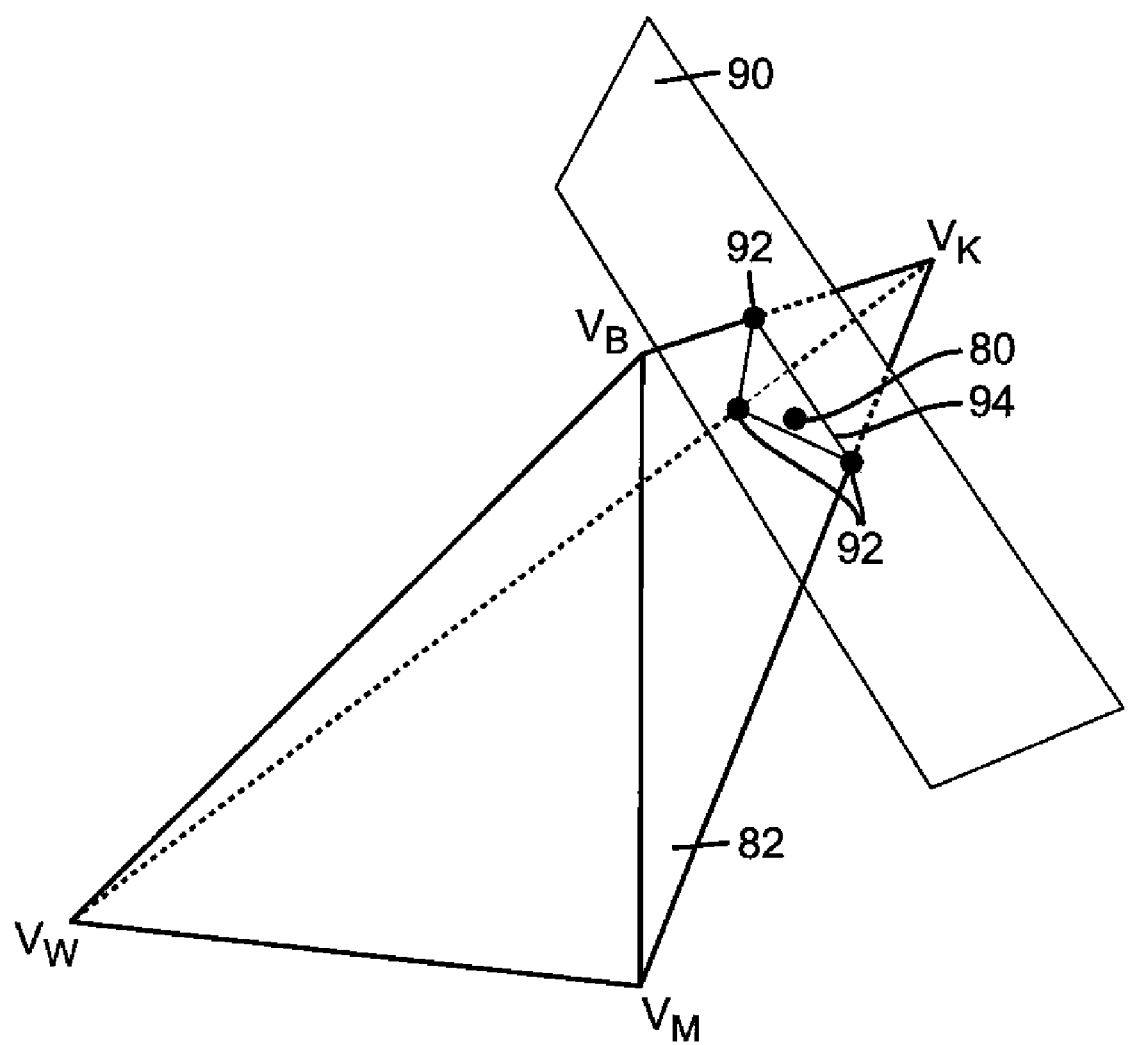
FIG. 9 is a diagram showing a slicing plane.

Once the color mappings 52 for the set of paths are defined, the next step is to define the full color mapping function 54. The define full color mapping function step 53 works by interpolating between the color mappings 52 defined for the set of paths. The goal is to determine the colorant control values corresponding to any arbitrary set of three-channel color space values. One method for performing this interpolation will now be described, however, one skilled in the art will recognize that there are many ways that the interpolation process can be performed. The color space cube shown in FIG. 6 can be broken into a series of tetrahedra having the defined paths along their edges. FIG. 8 shows an arbitrary three-channel color space point 80. In this example, the three-channel color space point 80 falls within a three-channel color space tetrahedron 82 having as its vertices the white vertex $V_W$, the black vertex $V_K$, the blue vertex $V_B$ and the magenta vertex $V_M$, and as it edges the white-to-magenta path, the white-to-blue path, the white-to-black path, the blue-to-black path, the magenta-to-black path, and the magenta-to-blue path. The color mapping for the three-channel color space point 80 can be determined by interpolating between the color mappings for the paths along these edges. In a preferred embodiment of the present invention, this interpolation is accomplished by slicing through the three-channel color space tetrahedron 82 with a plane perpendicular to the neutral axis (the line connecting the black vertex $V_K$ to the white vertex $V_W$), as shown in FIG. 9. (The same part numbers are used here as were used in FIG. 8 to refer to the identical elements.) A slicing plane 90 is used to slice through the three-channel color space tetrahedron 82 such that the plane contains the three-channel color space point 80. The slicing plane intersects three of the paths at a series of slice vertices 92, which define the vertices of a slice triangle 94. (Depending on where the three-channel color space point 80 lies within the color space cube, the slicing plane 90 can intersect four edges of the three-channel color space tetrahedron 82 producing four slice vertices 92. Two triangles can be formed, one of which will contain the three-channel color space point 80.) The color mapping for the three-channel color space point 80 can be determined by interpolating between the color mappings for the slice vertices 92 using standard linear interpolation techniques. With such techniques the color mappings for the three slice vertices 92 are weighted with weights determined from the relative position of the three-channel color space point 80 within the slice triangle 94. One common linear interpolation method uses barycentric weights for the triangle vertices as described in commonly assigned U.S. patent application Ser. No. 10/845,037 filed May 13, 2004 by Gustav J. Braun, et al., entitled "Determining Sets of N-Dimensional Colorant Control Signals", the disclosure of which is herein incorporated by reference.

Figure 5:
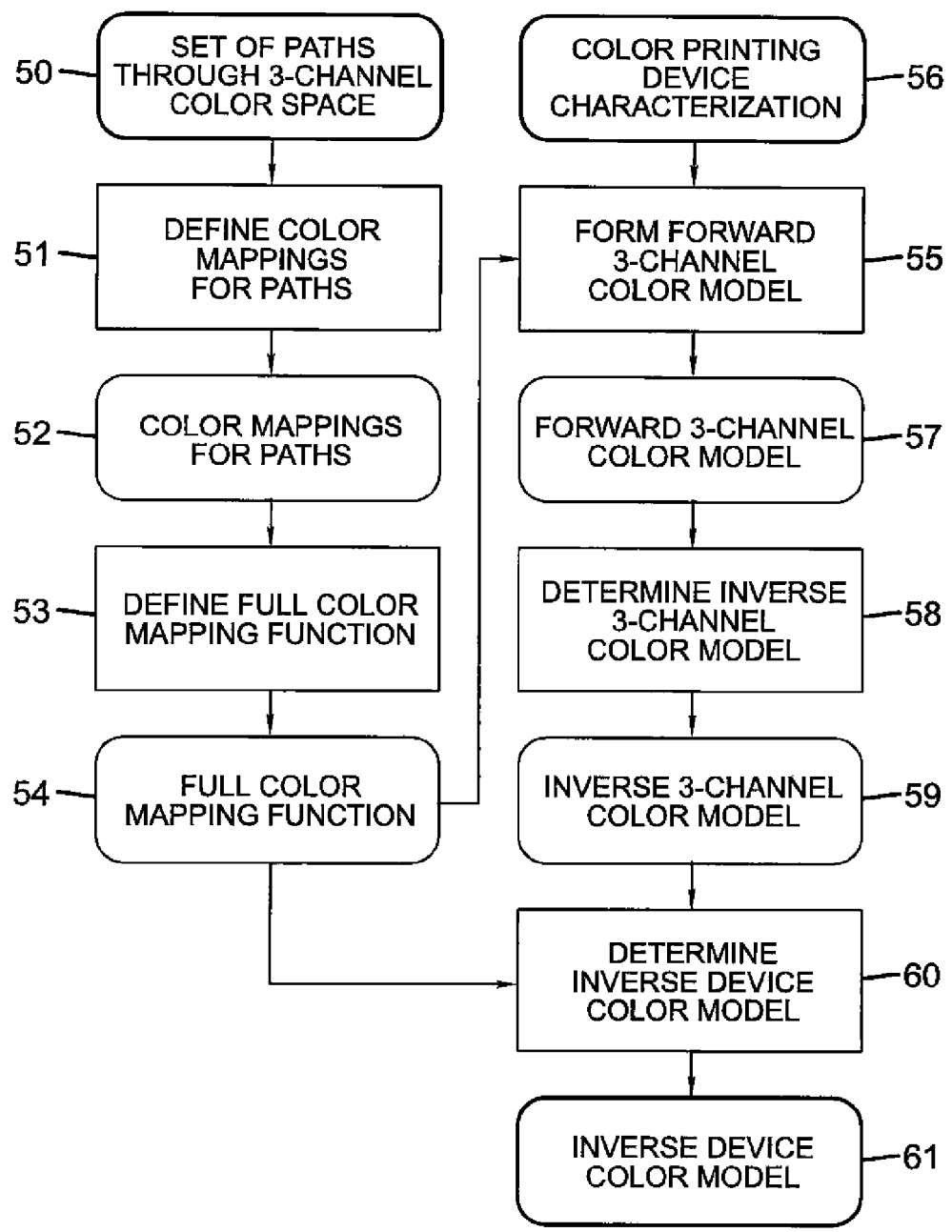
FIG. 5 is a flow chart showing the method of the present invention.

Using this approach, the full color mapping function 54 in FIG. 5 can be defined by performing this slicing/interpolation process on a point-by-point basis for any three-channel color space value within the domain of the three-channel color space. In one implementation of the present invention, the slicing/interpolation process is used to evaluate the color mapping for a lattice of three-channel color space values, forming a three-dimensional LUT that can be used to represent the full color mapping function 54. Standard three-dimensional interpolation techniques, such as tri-linear or tetrahedral interpolation, can then be used in combination with the three-dimensional LUT to evaluate the color mapping function 54.

Once the full color mapping function 54 is defined, it can be combined with a color printing device characterization 56 to form a forward three-channel color model 57 using the form forward three-channel color model step 55. There are many ways that this step can be accomplished. In one embodiment of the present invention, a test target is formed having color patches specified by three-channel color space values. The three-channel color space values are then mapped through the color mapping function 54 to determine corresponding colorant control values for the patches. Device-independent color values are then determined for each of the patches. One way to do this is to print the color patches on the color printing device, and then measuring the color patches using a color measurement device, such as a spectrophotometer or a calorimeter, to determine the resulting device-independent color values. In a preferred embodiment of the present invention, the device-independent color values are given in terms of the well known CIELAB color space, although many other device-independent color spaces would also be appropriate for the practice of this invention.

Another way to determine the device-independent color values for the color patches is by modeling the device response for the color printing device, and using the model to predict the device-independent color values from the colorant control values for the patches.

Once the device-independent color values for the patches have been determined, standard color modeling techniques, such as that described by D'Errico in U.S. Pat. No. 4,992,861, can be used to determine a forward three-channel color model 57 from the patch data. The forward three-channel color model 57 will relate the three-channel color space values to the corresponding device-independent color values. Since it has three input dimensions and three output dimensions, the forward three-channel color model 57 can be inverted using standard function inversion techniques to determine an inverse three-channel color model 59, relating the device-independent color values to corresponding three-channel color space values. In a preferred embodiment of the present invention, an interpolation-based inversion technique is used, such as that described by Hung in "Colorimetric calibration in electronic imaging devices using a look-up table model and interpolations" (Journal of Electronic Imaging, Vol. 2(1), pp. 53-61, 1993). It should be noted that the inverse color mapping can only be determined for device-independent color values that fall within the color gamut of the color printing device. Any device-independent color values that fall outside the color gamut of the color printing device, should first be gamut mapped to device-independent color values that fall on or inside the color gamut of the color printing device. There are many different gamut mapping techniques that are well known to one skilled in the art that can be used for this purpose. For example, one simple gamut mapping technique is to simply clip the chroma value while holding hue and lightness constant, although this generally does not produce optimal results. Another method that provides better results is to find the in-gamut color value that has the minimum Delta E* color difference relative to the out-of-gamut color. A variation of the minimum Delta E* gamut mapping method that produces effective results in many cases is to apply different weights to the hue, lightness and chroma portions of the color error before calculating the color difference.

Figure 4:
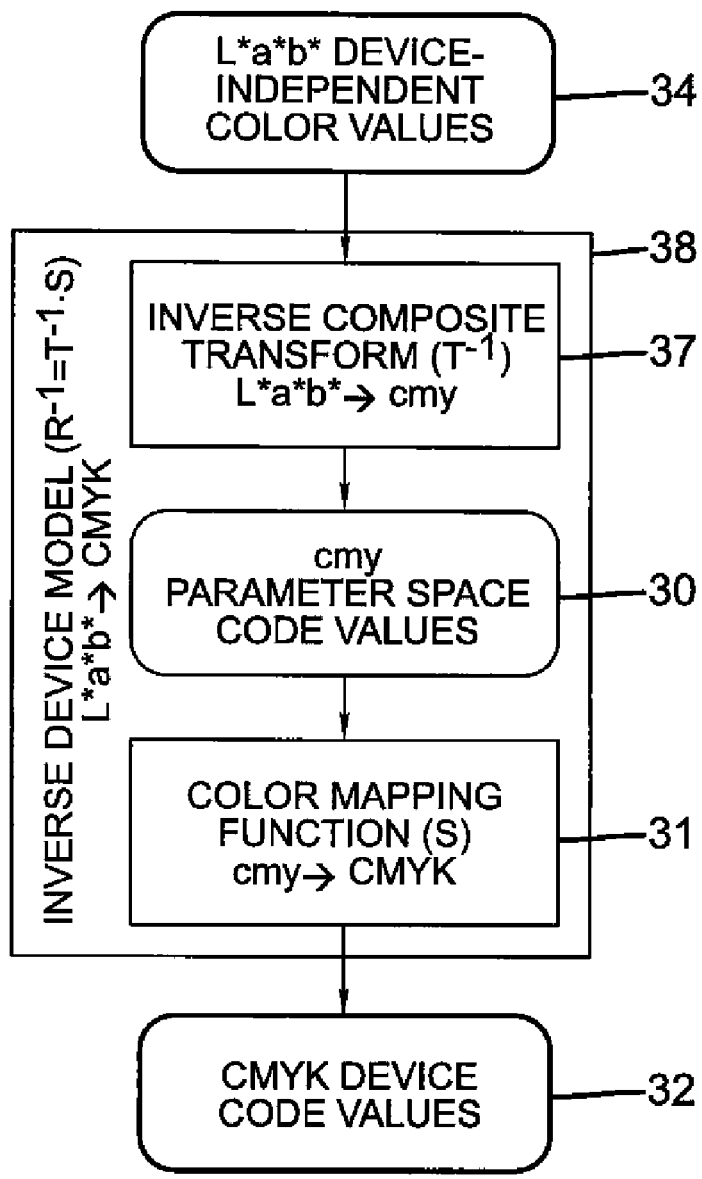
FIG. 4 is a flowchart showing the formation of an inverse device model using the prior art method of FIG. 3.

The next step is to determine an inverse device color model 61 by combining the inverse three-channel color model 59 with the full color mapping function 54 using the determine inverse device color model step 60. This can be accomplished by using the three channel color space values that are the output of the inverse three-channel color model 59 as the input to the full color mapping function 54. This step is equivalent to that used in the prior art process illustrated in FIG. 4. The resulting inverse device model 61 relates the device-independent color values to the corresponding colorant control values that should be used to produce those device-independent color values on the color printing device in accordance with the optimization process used to determine the color mappings 51 for the set of paths.

Figure 10:
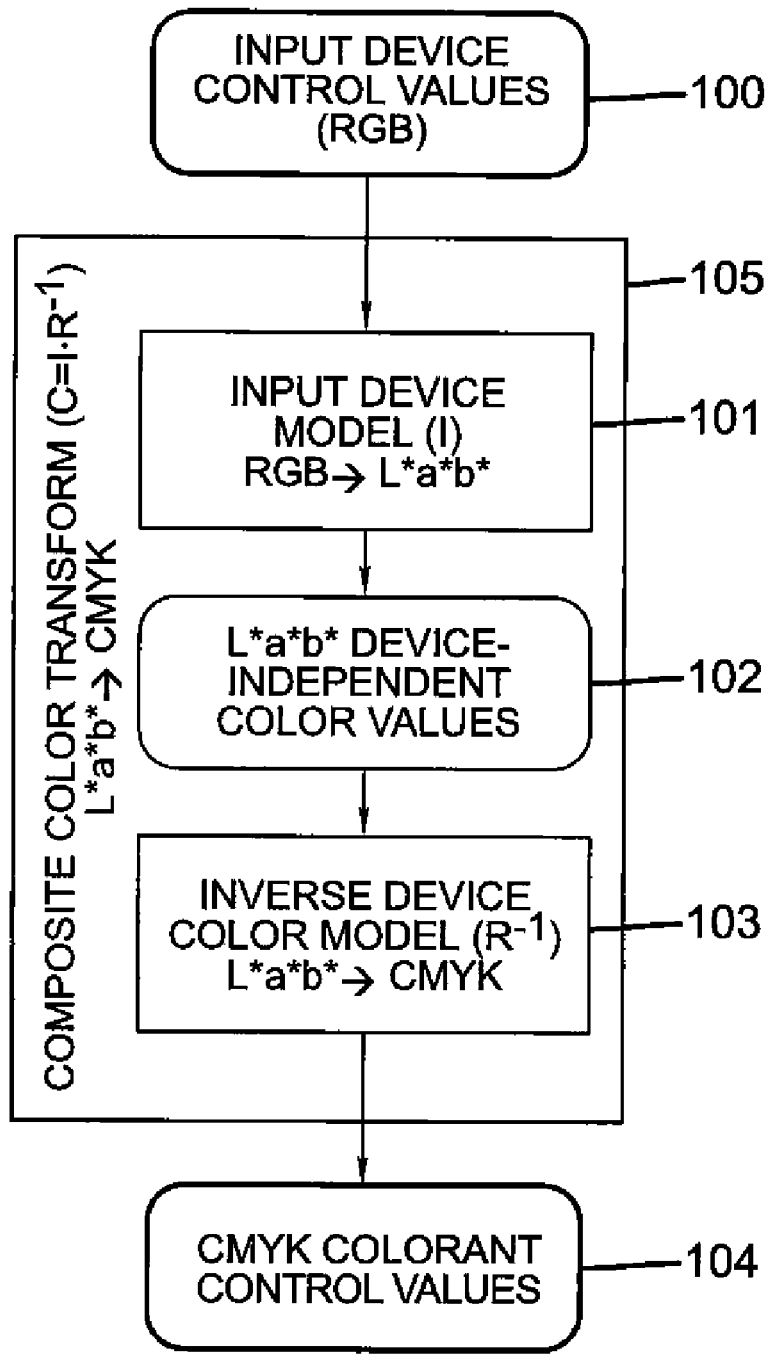
FIG. 10 is a flow chart showing the formation of an inverse device model.

In some applications, the inverse device color model 61 can be used directly. For example, the inverse device color model 61 can be used to populate an output device profile, such as those associated with the well known International Color Consortium (ICC) color management system. In other applications, the inverse device color model 61 can only be an intermediate result. For example, it can be desirable to combine an input device color model for an input device with the inverse device color model 61 for the color printing device to determine a composite color transform relating input device code value to corresponding colorant control values for the four or more colorants for the color printing device. This process is illustrated in FIG. 10. In this example, the input device is an RGB device with input device control values 100. An input device model 105 is used to determine device-independent color values 102 corresponding to the input device control values 100. The inverse device color model 103 is then used to determine corresponding CMYK colorant control values 104. The input device model 101 can be combined with the inverse device color model 103 to form a composite color transform 105, which can be used to directly compute the output colorant control values 104 from the input device control values 100.

Although most common color printing devices today use CMYK colorants, there are an increasing number of color printing devices that are using additional colorants as well. Some devices have added lighter versions of one or more of the CMYK colorants in order to reduce image noise. For example, many ink jet printers add light cyan, light magenta colorants to the CMYK colorant set. Others add a light black colorant (gray). Light yellow colorants can also be used, although there is typically less value for light yellow colorants since yellow ink generally have low noise visibility to begin with. It is also becoming increasingly common for printers to add additional chromatic colorants such as red, blue, green, or orange. The use of these colorants is intended to extend the color gamut of the color printing device. The method of the present invention can also be used with any of these extra colorant configurations. The color mappings 52 defined for the set of paths 50 will map the three-channel color values to colorant control signals for the full set of colorants, rather than the CMYK colorant set assumed in the examples discussed earlier.

For example, for a color printing device that uses light cyan and light magenta colorants in addition to the CMYK colorants, the color mappings will have 6 output channels corresponding to the colorant control values for cyan, magenta, yellow, black, light cyan and light magenta. Likewise, this same set of 6 colorant control values will be the inputs to the color printing device characterization 56 that is used to determine the forward three-channel color model 57. The white-to-cyan path would be used to specify how the light and dark cyan inks would be used throughout the cyan tone scale.

Similarly, the method of the present invention can also be applied for a color printing device that uses one or more extended-gamut colorants in addition to CMYK. For example, consider a color printing device that uses red and blue colorants, as well as the conventional CMYK colorants. The color mappings for the set of paths can be used to control how the extra gamut colorants are used in different parts of color space. For example, the yellow-to-red path can be used to control how much magenta and red colorants would be used throughout that transition. Maximizing the color gamut would be an important factor in an optimization process for determining the optimal path, but other factors would also include image noise and total colorant amount. As more colorants are added, there can be a large benefit to adding additional paths to the set of paths, beyond those shown in FIG. 6. For example, it can be desirable to add additional paths connecting the white and black points to intermediate colors on the transition between yellow and red to provide more control of the colorant usage through that portion of color space.

The method of the present invention can be generalized to include defining color mappings for other subsets of colors in the three-channel color space besides the paths that have been described in the preceding examples. For example, color mappings can be specified for one or more points in the three-channel color space. In this case, a specific three-channel color space value is mapped to corresponding colorant control values for the four or more colorants Similarly, color mappings can also be specified for one or more paths, surfaces or volumes in the three-channel color space. For example, it may be desirable to specify a color mapping function that would get applied for one of the surfaces of the three-channel color space cube, or a color mapping function that would get applied for colors in a volume defined by the convex hull of skin tone colors. The subset of colors for which the color mapping is defined could contain one or more of the different region types. For example, a subset could be defined comprising a set of paths, a surface, and a volume. Once the color mapping for the subset of colors in the three-channel color space have been defined, the color mapping function for the full three-channel color space can be determined by interpolating between the color mapping defined for the subset of colors.

Although all of the examples that have been discussed have included CMYK colorants, it will be obvious to one skilled in the art that the method of the present invention can also be applied to sets of colorants that do not include any or all of the CMYK colorants. For example, it can be applied for a color printing device using cyan, magenta, yellow, red, and blue. There is also no limitation that the method be applied to hard-copy color printing devices. It can also be applied for soft-copy color display devices, such as CRT, LCD or OLED displays, having four or more additive primaries. For example, it can be used for a softcopy display using red, green, blue, and white primaries. It can also be used for a softcopy display using four or more chromatic primaries.

The invention has been described in detail with particular reference to certain preferred embodiments thereof, but it will be understood that variations and modifications can be effected within the spirit and scope of the invention.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

PARTS LIST

10 RGB device code values
12 forward device model
14 device-independent color values
16 build three-channel inverse device model step
18 inverse device model
20 CMYK device code values
22 forward device model
24 device-independent color values
26 build four-channel inverse device model step
28 inverse device model
30 parameter space code values
31 color mapping function
32 CMYK device code values
33 forward device model
34 device-independent color values
35 composite transform
36 build inverse composite transform step
37 inverse composite transform
38 inverse device model
50 set of paths
51 define color mappings for paths step
52 color mappings
53 define full color mapping function step
54 full color mapping function
55 form forward three-channel color model step
56 color printing device characterization
57 forward three-channel color model
58 determine inverse three-channel color model step
59 inverse three-channel color model

PARTS LIST (CON'T)

60 determine inverse device color model step
61 inverse device color model
62 white-to-primary paths
63 white-to-secondary paths
64 black-to-primary paths
65 black-to-secondary paths
66 primary-to-secondary paths
67 neutral axis path
80 three-channel color space point
82 three-channel color space tetrahedron
90 slicing plane
92 slice vertices
94 slice triangle
100 input device control values
101 input device model
102 device-independent color values
103 inverse device color model
104 colorant control values
105 composite color transform

The invention claimed is:

1. A method for determining colorant control values for a color imaging device having four or more colorants, comprising:
   a) defining a color mapping for a set of paths through a three-channel color space relating the three-channel color space values along that path to corresponding colorant control values for the four or more colorants of the color imaging device;
   b) defining a color mapping function for the three-channel color space relating the three-channel color space values to colorant control values for the four or more colorants of the color imaging device by interpolating between the color mapping defined for the set of paths, including:
      i) for each input three-channel color space value, slicing through the three-channel color space with a plane that includes the input three-channel color space value;
      ii) identifying slice vertices corresponding to the intersections between the set of paths and the plane;
      iii) using the color mapping for the set of paths to determine vertex colorant control values corresponding to the three-channel color space value at the slice vertices; and
      iv) interpolating between the vertex colorant control values to determine colorant control values corresponding to the input three-channel color space value;
   c) forming a forward three-channel color model relating the three-channel color space values to device-independent color values by using the color mapping function to relate the three-channel color space values to colorant control values for the four or more colorants of the color imaging device, and then further relating the colorant control values for the four or more colorants of the color imaging device to corresponding device-independent color values;
   d) inverting the forward three-channel color model to determine an inverse three-channel color model relating the device-independent color values to the three-channel color space values; and
   e) combining the inverse three-channel color model and the color mapping function to determine an inverse device color model relating device-independent color values to colorant control values for the four or more colorants of the color imaging device.

2. The method according to claim 1 wherein step c) includes:
   i) forming a test target having patches specified by three-channel color space values;
   ii) mapping the three-channel color space values for the patches through the color mapping function to determine corresponding colorant control values for the patches; and
   iii) determining device-independent color values for the patches corresponding to the colorant control values for the patches.

3. The method according to claim 2 where the device-independent color values are determined by forming patches on the color imaging device and measuring the device-independent color values of the patches using a color measurement device.

4. The method according to claim 2 where the device-independent color values are determined by modeling the device response of the color imaging device.

5. The method according to claim 1 where the set of paths includes a neutral axis path connecting a black point and a white point of the three-channel color space.

6. The method according to claim 1 where the three-channel color space is a color space with cyan, magenta, and yellow primary colors and red, green, and blue secondary colors.

7. The method according to claim 6 where the set of paths include one or more paths connecting a black point or a white point with the cyan, magenta, or yellow primary colors of the three-channel color space.

8. The method according to claim 6 where the set of paths include one or more paths connecting a black point or a white point with the red, green, or blue secondary colors of the three-channel color space.

9. The method according to claim 6 where the set of paths includes one or more paths connecting one of the cyan, magenta, or yellow primary colors of the three-channel color space to one of the red, green, or blue secondary colors of the three-channel color space.

10. The method according to claim 1 where the color mapping for the set of paths is determined by using an optimization process having a cost function including one or more cost terms.

11. The method according to claim 10 where the one or more cost terms include a term for maximizing color gamut, a term for reducing noise, a term for reducing illuminant sensitivity, or a term for reducing the total colorant amount.

12. The method according to claim 10 where the optimization process incorporates a total colorant amount limit constraint.

13. The method according to claim 10 where the optimization process incorporates a constraint excluding the use of a black colorant in a specified region of the three-channel color space.

14. The method according to claim 10 where the color mapping for at least one of the paths is defined by a spline function specified by a set of knot points relating the three-channel color space values to corresponding colorant control values for the four or more colorants of the color imaging device, and where the colorant control values at the knot points are determined using the optimization process.

15. The method according to claim 1 where the device-independent color values are CIELAB color space values.

16. The method according to claim 1 where the step of determining the inverse model includes a gamut-mapping step to map device-independent color values outside the color gamut of the color imaging device to device-independent color values on or inside the color gamut of the color imaging device.

17. The method according to claim 1 further including combining the inverse device color model for the color imaging device with an input device model to determine a composite color transform relating input device control values to corresponding colorant control values for the four or more colorants of the color imaging device.

18. The method according to claim 1 where the colorants used by the color imaging device include cyan, magenta, yellow, and black colorants.

19. The method according to claim 18 where additional light colorants are used by the color imaging device, corresponding to light cyan, light magenta, light yellow, or gray colorants.

20. The method according to claim 18 where additional extended-gamut colorants are used by the color imaging device.

21. The method according to claim 1 where the color imaging device is a soft-copy color display device.

22. The method according to claim 1 where the color imaging device is a hard-copy color printing device.

23. A computer storage product having at least one computer storage medium having instructions stored therein causing one or more computers to perform the method according to claim 1.

* * * * *